United States Patent
Yurkov et al.

(10) Patent No.: US 10,516,498 B1
(45) Date of Patent: Dec. 24, 2019

(54) WIFI MULTI-USER CPE AND ICI MITIGATION

(71) Applicant: Quantenna Communications, Inc., Fremont, CA (US)

(72) Inventors: Kirill Yurkov, Saint Petersburg (RU); Mikhail Lyakh, Saint Petersburg (RU); Hossein Dehghan, Diablo, CA (US)

(73) Assignee: QUANTENNA COMMUNICATIONS, INC., San Jose, CA (US)

( * ) Notice: Subject to any disclaimer, the term of this patent is extended or adjusted under 35 U.S.C. 154(b) by 148 days.

(21) Appl. No.: 15/610,610

(22) Filed: May 31, 2017

(51) Int. Cl.
| | |
|---|---|
| *H04W 4/00* | (2018.01) |
| *H04J 11/00* | (2006.01) |
| *H04L 5/00* | (2006.01) |
| *H04L 27/26* | (2006.01) |
| *H04B 7/0413* | (2017.01) |
| *H04W 84/12* | (2009.01) |
| *H04W 88/08* | (2009.01) |

(52) U.S. Cl.
CPC ........ *H04J 11/0026* (2013.01); *H04B 7/0413* (2013.01); *H04L 5/0023* (2013.01); *H04L 27/2691* (2013.01); *H04W 84/12* (2013.01); *H04W 88/08* (2013.01)

(58) Field of Classification Search
CPC .. H04J 11/0026; H04B 7/0413; H04L 5/0023; H04L 27/2691; H04W 84/12; H04W 88/08
See application file for complete search history.

(56) References Cited

U.S. PATENT DOCUMENTS

| | | | | |
|---|---|---|---|---|
| 7,545,891 B1 * | 6/2009 | Pare, Jr. | ................ | H04L 5/0007 375/344 |
| 9,571,322 B2 * | 2/2017 | Bae | ..................... | H04L 27/2627 |
| 2007/0218854 A1 * | 9/2007 | Lawrence | ............... | H04B 1/28 455/310 |

(Continued)

OTHER PUBLICATIONS

Nirav shah et al. (carrier frequency offset correction for uplink multi-user MIMO for next generation Wi-Fi, 2015) (Year: 2015).*

(Continued)

*Primary Examiner* — Maharishi V Khirodhar
(74) *Attorney, Agent, or Firm* — Michael J. Scapin

(57) ABSTRACT

A WAP for wireless communications on a selected orthogonal frequency division multiplexed (OFDM) communication channel of a wireless local area network (WLAN). The transceiver includes: antennas, transmit and receive chain components, a stream separation control circuit, and an Inter Carrier Interference (ICI) removal circuit. The receive chain components include: an equalizer component converting a received uplink communication packet from one or more of the associated stations at an input into discrete communication streams at an output thereof. The stream separation control circuit couples to the equalizer component to control the separation of the communication streams at the output of the equalizer component into groups, with each group comprising all of the communication streams transmitted by a corresponding one of the one or more associated stations. The ICI removal circuit couples to the stream separation control circuit to discretely remove ICI from each group of streams.

20 Claims, 5 Drawing Sheets

(56) References Cited

U.S. PATENT DOCUMENTS

2008/0240268 A1* 10/2008 Yu .................... H04L 1/0056
                                                    375/260
2012/0275491 A1* 11/2012 Ancora ............... H04B 1/7097
                                                    375/148
2014/0192848 A1*  7/2014 Rao .................... H04L 5/00
                                                    375/219

OTHER PUBLICATIONS

Markku et al. (Space-Time Equalizers for MIMO High Speed WCDMA Downlinks, IEEE 2007) and Yu et al. (US 2008/0240268 A1). (Year: 2007).*
Li (Iterative receiver for MIMO-OFDM systems with joint ICI cancellation and channel estimation, IEEE2008). (Year: 2008).*
Lin et al. (A power efficient baseband engine for multiuser mobile MIMO-OFDM communications, IEEE 2010). (Year: 2010).*
Ville Syrjala, Mikko Valkama, Nikolay N. Tchamov, Jukka Rinne "Phase Noise Modelling and Mitigation Techniques in OFDM Communications Systems"; Tampere University of Technology, Department of Communications Engineering, Tampere Finland, IEEE 2009.

* cited by examiner

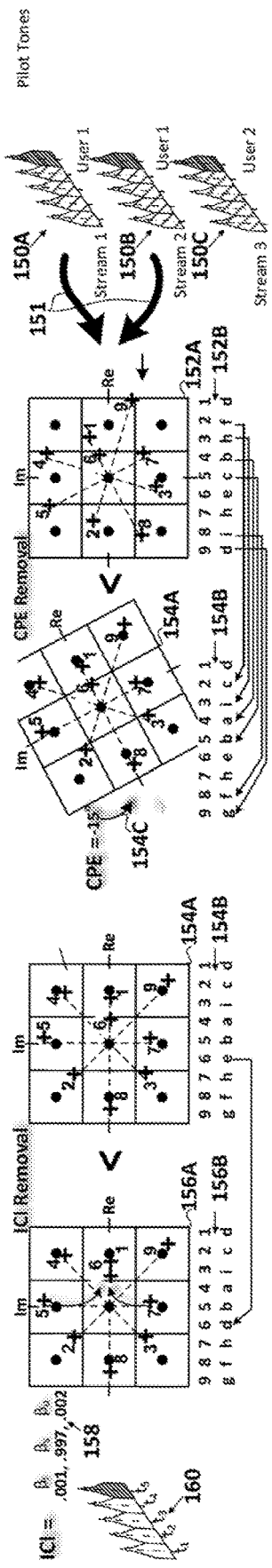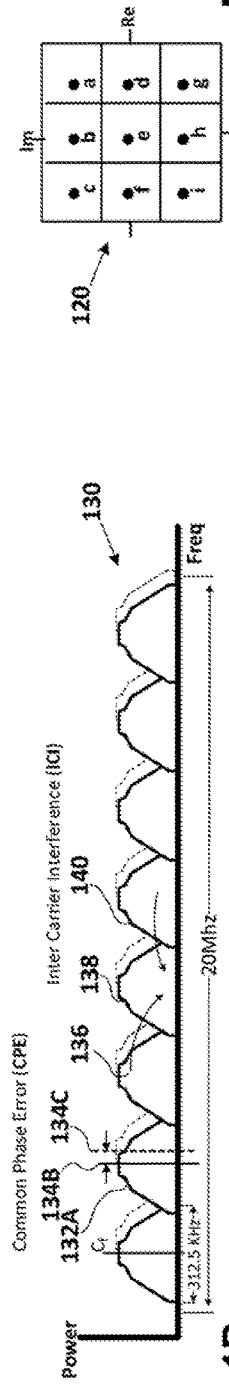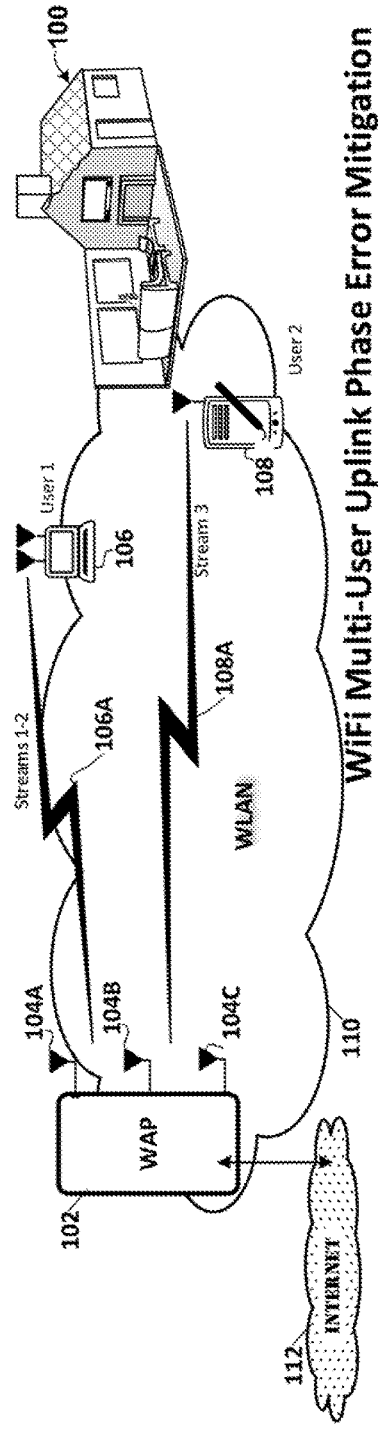

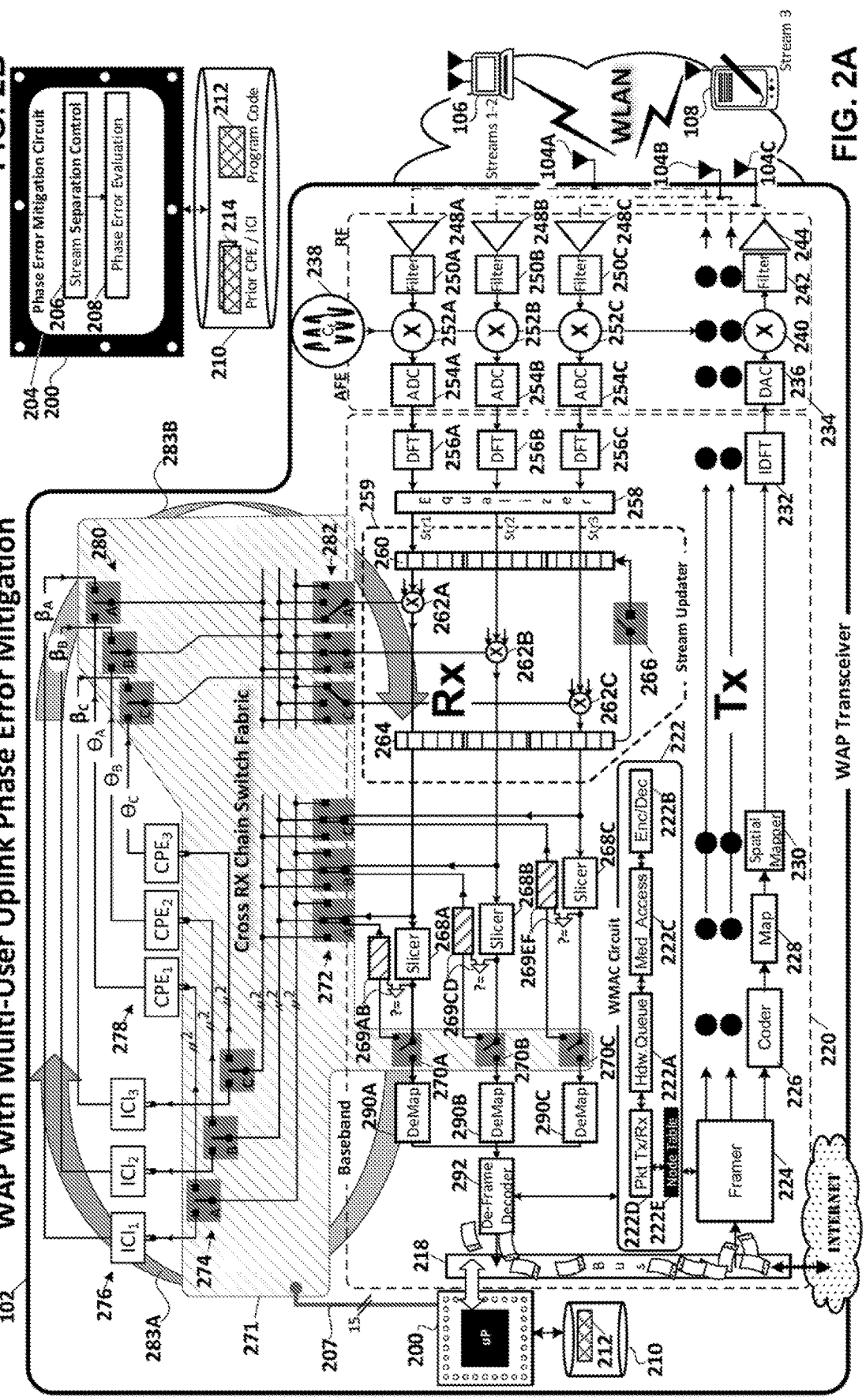

Proceed with Baseband Processing after Mitigation of CPE and ICI

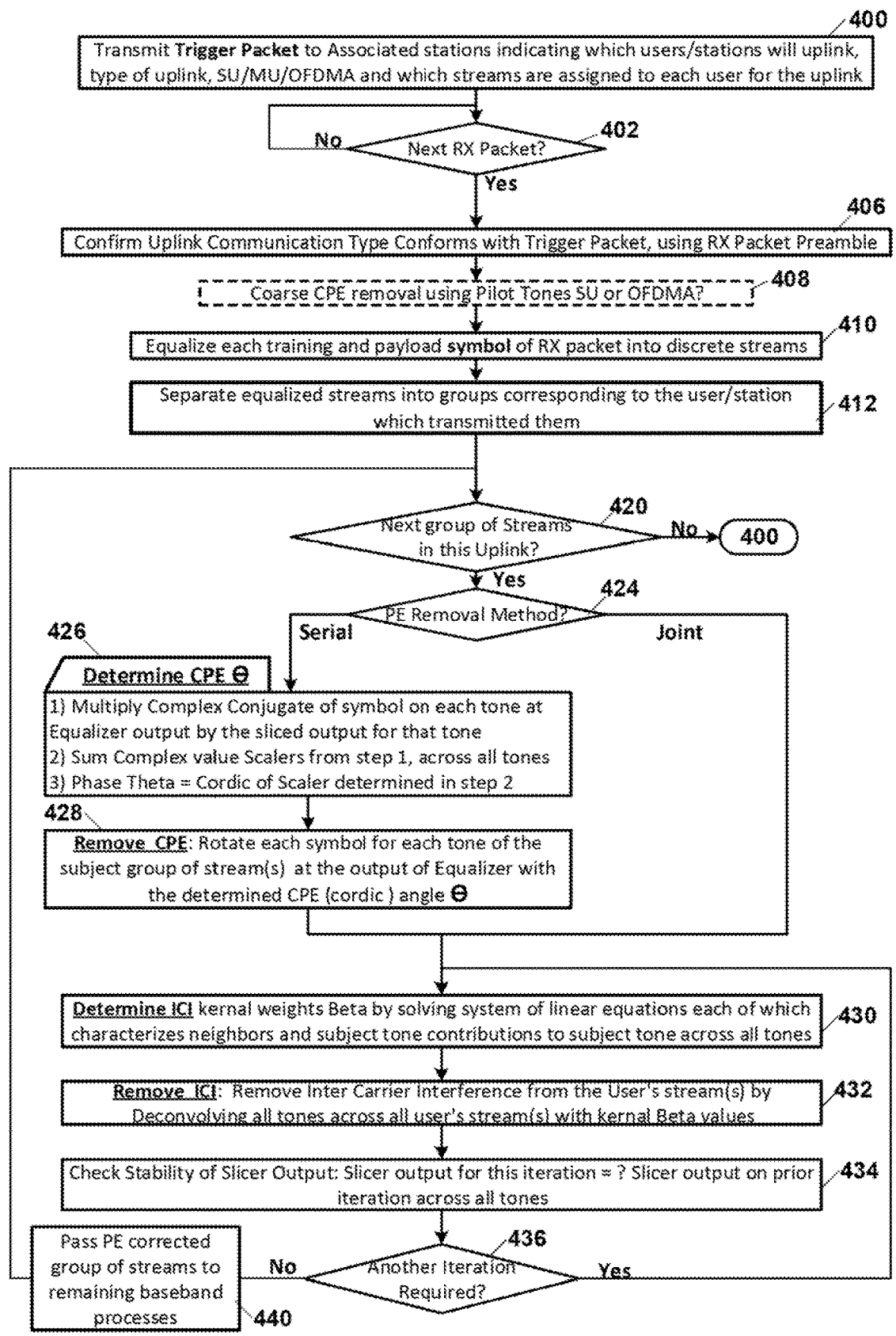
FIG. 4  Method for Multi-User CPE and ICI Mitigation

WIFI MULTI-USER CPE AND ICI MITIGATION

BACKGROUND OF THE INVENTION

1. Field of Invention

The field of the present invention relates in general to wireless local area networks including wireless access points (WAP) and wireless stations.

2. Description of the Related Art

Home and office networks, a.k.a. wireless local area networks (WLAN) are established using a device called a Wireless Access Point (WAP). The WAP may include a router. The WAP wirelessly couples all the devices of the home network, e.g. wireless stations such as: computers, printers, televisions, digital video (DVD) players, security cameras and smoke detectors to one another and to the Cable or Subscriber Line through which Internet, video, and television is delivered to the home. Most WAPs implement the IEEE 802.11 standard which is a contention based standard for handling communications among multiple competing devices for a shared wireless communication medium on a selected one of a plurality of communication channels. The frequency range of each communication channel is specified in the corresponding one of the IEEE 802.11 protocols being implemented, e.g. "a", "b", "g", "n", "ac", "ad", "ax". Communications follow a hub and spoke model with a WAP at the hub and the spokes corresponding to the wireless links to each 'client' device.

After selection of a single communication channel for the associated home network, access to the shared communication channel miles on a multiple access methodology identified as Collision Sense Multiple Access (CSMA). CSMA is a distributed random access methodology for sharing a single communication medium, by having a contending communication link back off and retry access a prospective collision on the wireless medium is detected, i.e. if the wireless medium is in use.

Communications on the single communication medium are identified as "simplex" meaning, one communication stream from a single source node to one or more target nodes at one time, with all remaining nodes capable of "listening" to the subject transmission. Starting with the IEEE 802.11ac standard and specifically 'Wave 2' thereof, discrete communications to more than one target node at the same time may take place using what is called Multi-User (MU) multiple-input multiple-output (MIMO) capability of the WAP. MU capabilities were added to the standard to enable the WAP to communicate with multiple stations including stations with a single antenna single stream capability as well as stations with multiple antenna and multiple stream capability concurrently, thereby increasing the time available for discrete MIMO video links to wireless HDTVs, computers tablets and other high throughput wireless devices the communication capabilities of which rival those of the WAP.

Starting with the IEEE 802.11ax standard two or more of the associated stations can uplink concurrently to the WAP using either the same set of orthogonal frequency division multiplexed (OFDM) tones, a.k.a. MU-MIMO uplink, or distinct sets of OFDM tones, a.k.a. an orthogonal frequency division multiplexed access (OFDMA) uplink.

What is needed are improved methods for operating each communication link between the WAP and its associated stations.

SUMMARY OF THE INVENTION

The present invention provides a method and apparatus for a wireless access point (WAP) to enhance multi-user communications and to remove Inter Carrier Interference (ICI) therefrom.

In an embodiment of the invention a wireless access point (WAP) for wireless communications with associated stations on a selected orthogonal frequency division multiplexed (OFDM) communication channel of a wireless local area network (WLAN) is disclosed. The transceiver includes: a plurality of antennas, a plurality of components, a stream separation control circuit, and an Inter Carrier Interference (ICI) removal circuit. The plurality of components coupled to one another to form receive chains and transmit chains each coupled to a corresponding one of the plurality of antennas for multiple-input multiple-output (MIMO) wireless communications on the OFDM tones of the selected communication channel. The plurality of components forming the receive chains include: an equalizer component converting a received uplink communication packet from one or more of the associated stations at an input into discrete communication streams at an output thereof. The stream separation control circuit couples to the equalizer component to control the separation of the communication streams at the output of the equalizer component into groups, with each group comprising all of the communication streams transmitted by a corresponding one of the one or more associated stations. The ICI removal circuit couples to the stream separation control circuit to discretely remove ICI from each group of streams, to improve uplink communication.

The invention may be implemented in hardware, firmware or software.

Associated methods are also claimed.

BRIEF DESCRIPTION OF THE DRAWINGS

These and other features and advantages of the present invention will become more apparent to those skilled in the art from the following detailed description in conjunction with the appended drawings in which:

FIGS. 1A-D are respectively; a plan view of a residential wireless local area network (WLAN), a graph of an orthogonal frequency division multiplexed (OFDM) communication channel, a constellation diagram, and a sequence of constellation diagrams showing an embodiment of the phase error removal process of the invention;

FIGS. 2A-B are detailed hardware diagrams of respectively, a wireless access point with multi-user uplink phase error mitigation capabilities, and a processor circuit for controlling said mitigation capabilities;

FIG. 4 is a process flow diagram of processes associated with the mitigation of multi-user phase error in the WAP shown in FIG. 2A.

DETAILED DESCRIPTION OF THE EMBODIMENTS

Figure 3A:
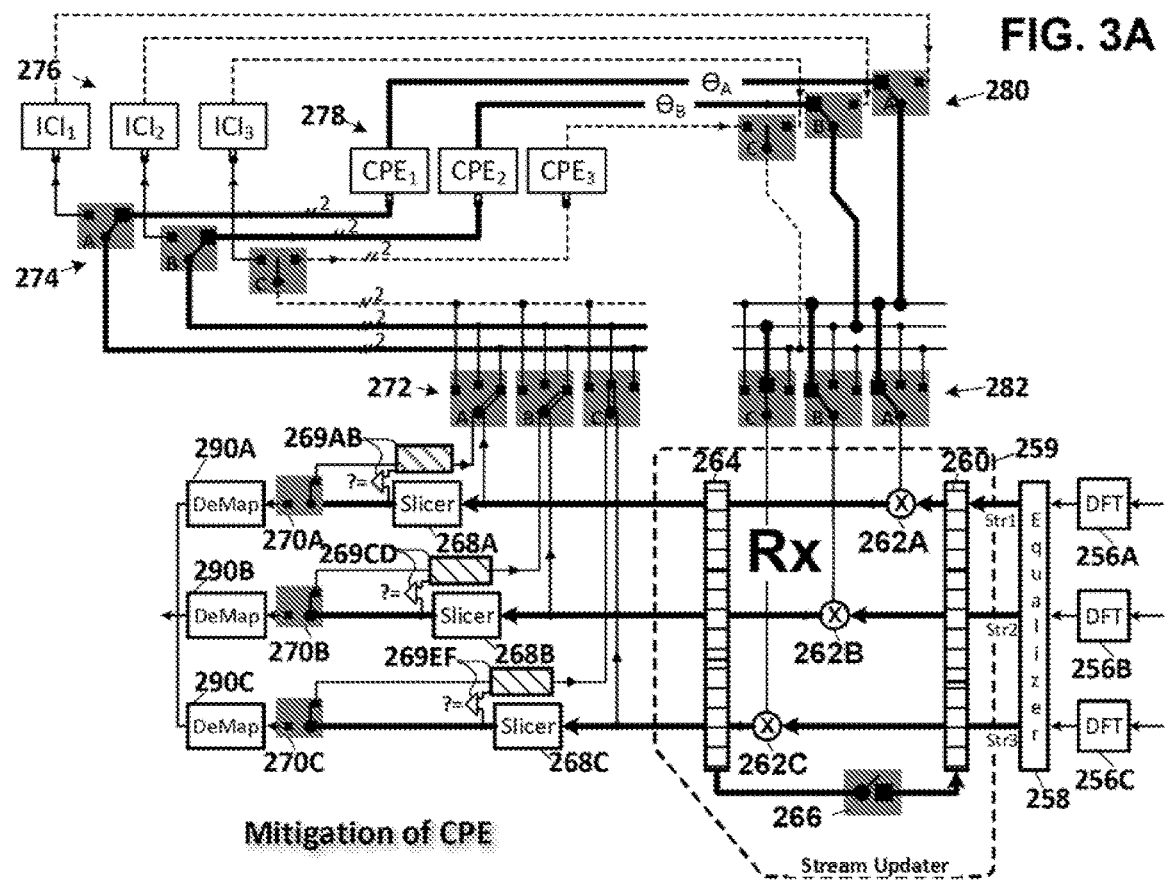
FIGS. 3A-C are hardware diagrams of the phase error mitigation circuits shown in FIG. 2A at various stages of mitigation.

FIGS. 1A-D are respectively; a plan view of a residential wireless local area network (WLAN), a graph of an orthogonal frequency division multiplexed (OFDM) communication channel, a constellation diagram, and a sequence of constellation diagrams showing an embodiment of the phase error removal process of the invention.

FIG. 1A is a plan view of a residential WLAN 110 in home 100. The WLAN includes two stations 106, 108, a.k.a. clients or users, and a wireless access point (WAP) 102. The WAP has a multiple-input multiple-output (MIMO) array of antenna 104A-C which allows it to transmit and receive multiple communication streams concurrently. The WAP couples the stations to the Internet 112. The stations 106-108 are shown making a concurrent uplink 106A, 108A respectively to the WAP. Station 106 has MIMO capability and is shown transmitting two streams, e.g. streams 1-2, to the WAP, and station 108 is shown transmitting a single stream, e.g. stream 3 to the WAP. Each stream carries a unique set of user data, from the corresponding transmitting one of the stations. A multi-user concurrent uplink requires close coordination between the transmitting stations to synchronize their transmissions of the uplink communication packet. The IEEE 802.11ax standard proscribes a trigger packet sent by the WAP to the target stations for the uplink to initiate the uplink and permit the coordination of the timing thereof. The IEEE 802.11ax standard proscribes two methodologies for supporting multi user uplinks. Where each station uses a distinct set of the OFDM tones on the selected communication channel the uplink is referred to as an OFDMA uplink, with the suffix "A" standing for "Access". Where each station uses the same set of OFDM tones on the selected communication channel the uplink is referred to as a multi-user (MU) MIMO uplink. Where the uplink includes more than two stations, the uplink may be effected with a combination of OFDMA and MU-MIMO modulation techniques.

FIG. 1B is a graph 130 of power vs Frequency for the OFDM tones of a communication channel. OFDM tones, a.k.a. sub-channels, 132A, 136, 138, 140 are shown. Each has a bandwidth specified by the relevant IEEE 802.11 standard. In the example shown, a set of tones each with a 312.5 kHz bandwidth collectively span a 20 MHz or wider communication channel in accordance with the IEEE 802.11ax communication standard. Ideally both uplink stations 106-108 would transmit each OFDM tone of the communication channel at the exact center frequency specified by the standard. In practice however, the phase locked loop (PLL) circuit which controls the voltage controlled oscillator (VCO) which modulates each station's transmission does not provide this precision, and even if the VCO's were precise the two stations transmissions are not precisely aligned with one another. The phase errors resulting from this lack of precision are exacerbated in the case of a multi-user uplink because since neither station transmits with the same errors, the use of pilot tones among the OFDM tones to quantify the error is not practical where as in the case of an MU-MIMO uplink, the stations share the same OFDM tones. These phase errors degrade uplink communications and limit the modulation and coding schema (MCS) and therefore throughput rates that can be achieved on an uplink.

The phase errors on the receive side vary with each symbol interval. In the time domain these phase errors are of a multiplicative nature. In each symbol interval the phase errors in the frequency domain may be characterized as producing a uniform skew in the center frequency of all OFDM tones which is known as Common Phase Error (CPE), which varies with each symbol interval. The graph shows the proscribed center frequencies of the OFDM tones in solid line and the actual center frequencies of the OFDM tones as received in dashed line. For OFDM tone/subchannel 132A the actual center frequency 134C is offset from the proscribed center frequency 134B. The average frequency offset across all tones is referred to as CPE. The phase errors may also be characterized on the receive as producing Inter Carrier Interference (ICI) in which the data or symbol transmitted on each neighboring tone overlaps with and produces an error in each subject tone. This tone specific error is shown in FIG. 1B for subject tone 138 as effecting the symbol transmitted on the subject tone, with contributions from the symbols transmitted on neighboring tones 136 and 140. ICI mitigation may be extended to take into account the contribution from next nearest neighboring tones to each subject tone. The subject invention provides method and apparatus for reducing or mitigating the effect of these errors.

FIG. 1C is a constellation diagram 120 with a grid superimposed on a real and imaginary axis. The grid borders are equidistant between constellation points. Each constellation point corresponds to a combination of phase and amplitude in the modulation of the information signal on each OFDM sub-channel. Each constellation point corresponds to a unique sequence of transmitted bits. The receiver, and specifically a component identified as a slicer thereof, makes a proximity decision for each tone in each symbol interval as to which portion of the grid the phase and amplitude of the received symbol falls into. The aforesaid phase errors effect the accuracy of the outcome of this decision. The removal of those errors therefore, improves the accuracy of the slicer proximity decision.

FIG. 1D is a sequence of constellation diagrams showing an embodiment of the phase error removal process in which Common Phase Error (CPE) and Inter Carrier Interference (ICI) are removed sequentially from the received streams. The OFDM tonesets associated with three uplink streams 150A-C are shown. Streams 1-2 referenced as 150A-B are transmitted by user 1, i.e. station 106. Stream 3 referenced as 150C is transmitted by user 2, i.e. station 108. Each stream includes user data tones and pilot tones shown with light and dark backgrounds respectively. The multi user uplink is an MU-MIMO uplink, in which both stations use the same set of OFDM tones for the uplink. On the receive side the two streams from user 1 are grouped together 151 and processed separately from the stream from user 2. CPE removal from the two streams from user 1, station 106, is pictorially represented by constellation diagrams 152A and 154A. The symbols received on all tones from both streams from user 1, station 106, are shown in constellation diagram 152A. CPE removal is pictorially represented as determining what rotation 154A of the constellation diagram 152A reduces the mean square error between each received symbol on each of the two streams from user 1, station 106, across all OFDM tones. In the simplistic example shown the angle 154C is −15 degrees. After CPE removal 6 of the 9 or 66% of the original slicer values 152B for the symbols on tones 1-9 of "d, f, h, b, c, e, h, i, d" have changed to the values 1548 of "d, c, i, b, e, h, f, g".

ICI removal involves the determination of kernel weights Beta 158 which characterized neighboring and self contributions to each subject tone across all tones, expressed as the solution of a system of linear equations each of which uniformly characterizes those contributions, followed by a deconvolution of all tones across all of user 1's streams with the kernel Beta values. ICI removal is pictorially represented by the next two constellation diagrams 154A, 156A. In constellation diagram 156A, the received symbol on tone 6 has moved from the center constellation point on the constellation diagram to the middle right constellation point due to the ICI from neighboring tones 5 and 7. After ICI removal an additional 1 of the 9 or 11% of the slicer values 154B for the CPE corrected symbols on tones 1-9 of "d, c, i, a, b, e, h, f, g" have changed to the values 156B of "d, c, i, a, b, d, h, f, g". The resultant toneset 160 is then passed to subsequent receive chain processes for demodulation of the received streams from user 1. The processing of the single stream from user 2 then takes place using the same methodology.

In an alternate embodiment of the invention ICI and CPE are removed jointly using the processes associated with ICI removal.

FIGS. 2A-B are detailed hardware diagrams of respectively, a wireless access point with multi-user uplink phase error mitigation capabilities, and a processor circuit for controlling said mitigation capabilities.

FIG. 2A is a detailed hardware block diagrams of a wireless transceiver, e.g. a WAP 102, in accordance with an embodiment of the current invention in which the transceiver comprises discrete interconnected very large scale integrated circuits (VLSI). Specifically, a VLSI WiFi stage circuit which includes the WiFi transmit and receive baseband and AFE/RF circuits 220, 234 respectively; and antennas 104A-C. The wireless transceiver may be a WAP or a station. The transceiver supports wireless communications on a wireless local area network (WLAN) 110 which network provides associated stations 106, 108, access to the Internet 110.

The transceiver in this embodiment of the invention is a WAP identified as a 3×3 multiple-input multiple-output (MIMO) WAP supporting as many as 3 discrete communication streams over the 3 antennas 104A-C. The transceiver couples to the Internet via an Ethernet medium access control (EMAC) interface (not shown) over a cable, fiber, or digital subscriber line (DSL) backbone connection. A packet bus 218 couples the EMAC to the MIMO WiFi baseband 220, and the analog front end (AFE) and Radio Frequency (RF) stages 234.

In the baseband portion 220 wireless communications transmitted to or received from each user/client/station are processed. The baseband portion is dynamically configurable to support Single User (SU) MIMO, or multi user uplink or downlink communications. Supported multi user uplinks or downlinks are of two types identified as multi-user (MU) MIMO or OFDMA where the suffix "A" stands for 'Access'. For an MU-MIMO downlink the WAP transmits distinct data to two or more stations concurrently over the same set of OFDM tones. For an MU-MIMO uplink the WAP receives distinct user data from two or more stations concurrently over the same set of OFDM tones. For an OFDMA downlink the WAP transmits distinct data to two or more stations concurrently over distinct subsets of the OFDM tones. For an OFDMA uplink the WAP receives distinct user data from two or more stations concurrently over distinct subsets of the OFDM tones.

Transmission:

One of the three transmit paths/chains is shown. The transmit paths/chains include the following discrete and shared components. The WiFi medium access control (WMAC) component 222 includes: hardware queues 222A for each downlink and uplink communication stream; encryption and decryption circuits 222B for encrypting and decrypting the downlink and uplink communication streams; medium access circuit 222C for making the clear channel assessment (CCA), and making exponential random backoff and re-transmission decisions; and a packet processor circuit 222D for packet processing of the communication streams. The WMAC component has a node table 222E which lists each node/station on the WLAN, the station's capabilities, the corresponding encryption key, and the priority associated with its communication traffic.

Each sounding or data packet for wireless transmission on the transmit path components to one or more stations is framed in the framer 224. Next each stream is encoded and scrambled in the encoder and scrambler 226 followed by interleaving and mapping in a corresponding one of the interleaver mappers 228. Next all transmissions are spatially mapped in the spatial mapper 230 with an antenna mapping matrix (AMM) during antenna sounding, a spatial mapping matrix (SMM) during any channel sounding, or a beamforming matrix "Q" for transmission of user data packets subsequent to a sounding. The spatially mapped streams from the spatial mapper are input to Inverse Discrete Fourier Transform (IDFT) components 232 for conversion from the frequency to the time domain and subsequent transmission in the AFE and RF stage 234.

Each IDFT is coupled to a corresponding one of the transmit path/chain components in the AFE/RF stage 234. Specifically, each IDFT couples to an associated one of the digital-to-analog converters (DAC) 236 for converting the digital transmission to analog, upconverters 240, coupled to a common channel frequency voltage controlled oscillator (VCO) 238 for upconverting the transmission to the appropriate center frequency of the selected channel(s), filters 242, e.g. bandpass filters, for controlling the bandwidth of the transmission, and power amplifiers 244 coupled to antennas 104A-C.

Reception:

The three receive paths/chains include the following discrete and shared components. Received communications on the transceiver's array of MIMO antenna are subject to RF processing including downconversion in the AFE-RF stage 234. There are three receive paths/chains each including the following discrete and shared components: low noise amplifiers (LNA) 248A-C for amplifying the received signal under control of an analog gain control (AGC) (not shown) for setting the amount by which the received signal is amplified, filters 250A-C for bandpass filtering the received signals, downconverters 252A-C coupled to the VCO 238 for downconverting the received signals, analog-to-digital converters (ADC) 254A-C for digitizing the downconverted signals. The digital output from each ADC is passed to a corresponding one of the discrete Fourier transform (DFT) components 256A-C in the baseband portion 220 of the WiFi stage for conversion from the time to the frequency domain.

Receive processing in the baseband stage includes the following shared and discrete components: an equalizer 258 to mitigate channel impairments and convert the received communications on each chain/path at the input to distinct streams at the output. The output of the equalizer is coupled to 4 components which collectively provide for the removal of phase error from the received streams. These components are: the stream updater 259, the slicers 268A-C, the cross RX chain switch fabric 271 and the ICI weighting factor calculators 276 and CPE angle calculators 278. Collectively these components provide a phase error removal loop 283A-B, or more specifically either an ICI removal loop, or a CPE removal loop depending on the functions performed, which loop subjects the received streams with phase induced errors at the output of the equalizer to one or more rounds, iterations of ICI or CPE or joint ICI-CPE removal before passing the 'error corrected' streams to remaining components of the baseband receive chains for demodulation. The aforesaid components which form the phase error removal loop operate under the control of the phase error mitigation circuit 204 shown in FIG. 2B and more specifically the stream separation control circuit 206 and the phase error evaluation circuit 208 thereof. The stream separation control circuit controls the grouping and processing of the streams along the phase error removal loop and the phase error evaluation circuit determines when the iterative removal of phase error is complete. In an embodiment of the invention these circuits may be instantiated on a processor circuit 200 via the execution of program code 212 stored in non-volatile memory or storage 210.

The stream updater circuit 259 stores updates to the processed streams during each iteration of the phase error removal loop. The stream updater circuit includes memory registers 260 and 264, a writeback switch 266 and multipliers 262A-C. The cross-fabric switch delivers the CPE removal angle and or ICI kernel weights coefficients to the corresponding ones of the multipliers. In the case of a multi user uplink, either MU-MIMO or OFDMA, the multipliers associated with the group of streams from one of the uplink stations are given a user specific, i.e. station specific, set of CPE or ICI coefficients, while the multiplier(s) coupled to the next group of stream(s) is/are given distinct user specific, i.e. station specific, CPE or ICI coefficients. Where CPE is being removed the multiplier multiplies each OFDM tone in the OFDM toneset of a given stream by the CPE angle coefficient. Where ICI is being removed the multiplier multiplies each 'subject' and neighboring OFDM tone in the OFDM toneset of a given stream by the ICI weighting coefficients. The resultant error corrected stream is stored in memory register 264. The error corrected symbols in memory register 264 are then written back to memory register 260 via writeback switch 266 so that the error removal loop is initialized for one or more rounds of error correction in the same symbol interval. Multiple iterations, rounds, of error correction may be required during each symbol interval.

During each iteration, within a single symbol interval, of the phase error removal loop the slicers 268A-C accept the 'error corrected' equalizer streams from memory register 264 and specifically the 'error corrected' symbols thereof on each iteration of the phase error removal loop, and determine which constellation point on the corresponding constellation diagram each symbol corresponds with. In each iteration the current slicer output is compared via comparators 269A. 269C, 269E to the slicer output from the prior iteration as stored in the corresponding one of registers 269B, 269D, 269F. Using this information the phase error evaluation circuit 208 determines when variations in slicer output between successive iterations of ICI removal falls below a threshold level. In an embodiment of the invention this determination is percentage based, specifically the current and prior sliced value on each tone are compared, and the percentage of all the OFDM tones in the toneset having the same sliced value between iterations is determined as well as the remaining percentage of tones for which the sliced values have not stabilized, i.e. have varied, between iterations. When the percentage of tones which have not stabilized between iterations falls below a threshold level phase error removal is deemed complete and the streams are passed to remaining baseband components for demodulation of the received communication.

The cross RX chain switch fabric 271 switchably separates the received streams into groups under control of the stream separation control circuit 206. The cross RX chain fabric switch in an embodiment of the invention includes switch blocks 270A-C, 272, 274, 280 and 282. During one or more phase error removal iterations switch block 270A-C pass the slicer output to switch block 272, to initiate the phase error removal loop. Switch block 272 couples each streams slicer input and output to the appropriate one of the CPE or ICI calculators 276, 278. In the case of a multi user uplink the group of one or more streams from each user/station is processed by the same CPE or ICI calculator, to determine the required CPE angle coefficient or ICI weighting coefficients for that user's/station's group of streams. Switch block 274 switchably connects each group of streams to the corresponding one of the CPE or ICI calculators. Switch block 280 switchably couples the output of the active ones of the CPE or ICI calculators to switch block 282 which switchably couples the CPE angle coefficient or ICI weighting coefficients to the appropriate ones of the multipliers 262A-C. The switch fabric may be implemented as logical or physical switches, in various combinations of: software, firmware, or hardware without departing from the scope of the claimed invention.

The ICI weighting factor calculators 276 and CPE angle calculators 278 accept the appropriate slicer input and output values from which they make their CPE angle coefficient and ICI weighting coefficient determinations as follows.

Example

In the IEEE 802.11ax WiFi standard several users can transmit simultaneously during uplink transmission in different resource units (RU). There are numerous sources of error in this multi-user uplink. First, each user transmits using a different oscillator so they have different TX random oscillator drifts that produce different user dependent phase noises. Second, these phase noises are superimposed with the WAP's own receive oscillator drift. Third, different users are not ideally aligned with the carrier frequency so they have individual constant carrier frequency offset. In a multi user uplink the received signal at the WAP antennas is a mixture of signals from different users which makes it impractical to determine Common Phase Error (CPE) based exclusively on pilot tones.

We propose a method for detection and cancellation of CPE and Inter Carrier Interference (ICI) for multiple user reception.

CPE Estimation:

To find CPE angle θ we are solving the following optimization problem:

$$\sum_{s=0}^{N_{ss}-1} \sum_{j=1}^{I} |X_{sj} e^{i\theta} - X_{sj}^{HD}|^2 \to \min_{\theta}$$

where: Nss is the overall number of spatial steams in the group of streams for a corresponding one of the stations associated with the multi-user uplink. Where "I" is the set of tones which belongs to this user. Where $X_{sj}$ is an output of the equalizer for stream s and tone j and $X_{sj}^{HD}$ is the output of the slicer for stream a and tone j.

Taking derivative over θ we have $$\frac{\partial}{\partial \theta} \sum_{s=0}^{N_{ss}-1} \sum_{j=1}^{I} |X_{sj} e^{i\theta} - X_{sj}^{HD}|^2 = \sum_{s=0}^{N_{ss}-1} \sum_{j=1}^{I} \left| e^{i\theta} - \frac{X_{sj}^{HD} X_{sj}^*}{|X_{sj}|^2} \right|^2 = 0$$

From this equation, we have $$CPE\theta = \text{angle}\left(\sum_{s=0}^{N_{ss}-1} \sum_{j=1}^{I} X_{sj}^{HD} X_{sj}^*\right)$$

CPE to CFO Conversion:

If we have two consecutive estimations of CPE $\theta_0$ and $\theta_1$ for a given user on successive OFDM symbol intervals then we can estimate Carrier Frequency Offset (CFO) for the subject uplink station as $$CFO = \frac{\theta_0 - \theta_1}{L},$$

where L is the number of time samples in OFDM symbol interval including guard interval. Usually this formula is not so simple since CPE estimations are noisy and they are passed through PLL (phase locked loop). The carrier frequency offset in an embodiment of the invention can be used to adjust the WAP's voltage controlled oscillator (VCO) 238. In another embodiment of the invention the carrier frequency offset can be sent to the corresponding station or stations for internal adjustment of their own VCO(s).

ICI Estimation:

Both phase noise (PN) and CFO produce Inter Carrier Interference (ICI) which can be mathematically expressed as a convolution in frequency domain with changing over OFDM symbol kernel in PN case and fixed kernel for CFO case. During processing of each OFDM symbol we propose to calculate parameters of ICI individually for each user and their corresponding group of stream(s). Let's assume that for each user we chose some parameter m and intercarrier cancellation model could be expressed as $$X_{sk}^{IC} = \sum_{q=-m}^{m} \beta_q X_{sk+q}, s \in 0{:}N_{ss}-1, k \in I, \quad [1]$$

Where $X_{sk}$ is equalizer output, I is the set of tones belong to this user, s is the stream index, $N_{ss}$ is number of streams belongs to current user and m is some predefined value. Defining slicer output as $X_{sk}^{HD}$, $$\beta = (\beta_{-m} \ldots \beta_{-1}, \beta_0, \beta_1 \ldots \beta_m) \text{ and}$$

$$R_s = \begin{bmatrix} X_{s0} & \ldots & X_{sm/2} & \ldots & X_{sm-1} \\ X_{s1} & \ldots & X_{sm/2+1} & \ldots & X_{sm} \\ X_{s2} & \ldots & X_{sm/2+2} & \ldots & X_{sm+1} \\ & & \ldots & & \end{bmatrix} \in \mathbb{C}[N_{st}; m]$$

we have a Mean Square Error (MSE) minimization problem $$\sum_s \|\beta R_s - X_s^{HD}\|^2 \to \min_\beta$$

$$\text{If } R = \begin{bmatrix} R_0 \\ \ldots \\ R_{N_{ss}-1} \end{bmatrix} \in \mathbb{C}[N_{ss}N_{st}; m] \text{ and}$$

$$X^{HD} = \begin{bmatrix} X_0^{HD} \\ \ldots \\ X_{N_{ss}-1}^{HD} \end{bmatrix}$$

we have zero forcing (ZF) solution $$\beta = (R^*R)^{-1} R^* X^{HD}$$

Using this beta set we can recalculate new $X_{sk}^{IC}$ as in [2] and process next user. We iterate whole procedure until new $X_{sk}^{IC}$ will not change or all $\beta_q$ except $\beta_0$ will close to zero for each user.

In an embodiment of the invention phase errors are removed in sequence, e.g. CPE removal followed by one or more rounds/iterations of ICI removal all under the control of the phase error mitigation circuit 204 shown in FIG. 2B in general and more specifically the stream separation control circuit 206 and the phase error evaluation circuit 208 thereof. The stream separation control circuit controls the grouping and processing of the streams along the phase error removal loop and the phase error evaluation circuit determines when the iterative removal of phase error is complete. In another embodiment of the invention phase error removal is effected exclusively by the ICI weighting factor calculators 276 which remove CPE jointly with ICI. In an embodiment of the invention ICI phase error removal is limited to a fixed number of iterations. In another embodiment of the invention ICI phase error removal is evaluated on each iteration by the phase error evaluation circuit 208. In this latter embodiment of the invention, the phase error evaluation circuit determines when variations in slicer output between successive iterations of ICI removal falls below a threshold level and passes that determination to the stream separation control circuit 206 which then terminates the processing for that symbol interval and passes the 'error corrected' streams to the demapper deinterleavers 290A-B and deframer decoder 292. The received communication is then passed to the WMAC component 222 where it is decrypted with the decryption circuit 222B and placed in the appropriate upstream hardware queue 222A for upload to the Internet.

Figure 3B:
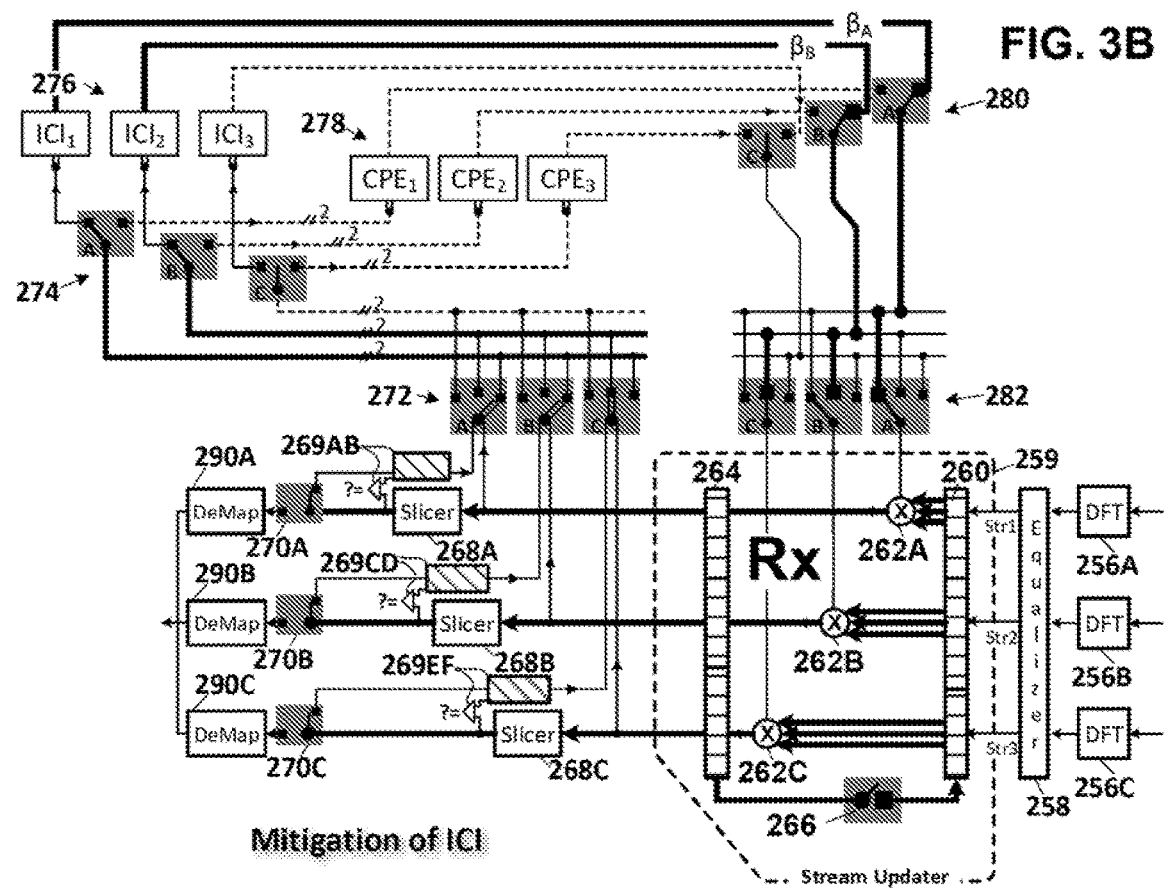
Figure 3C:
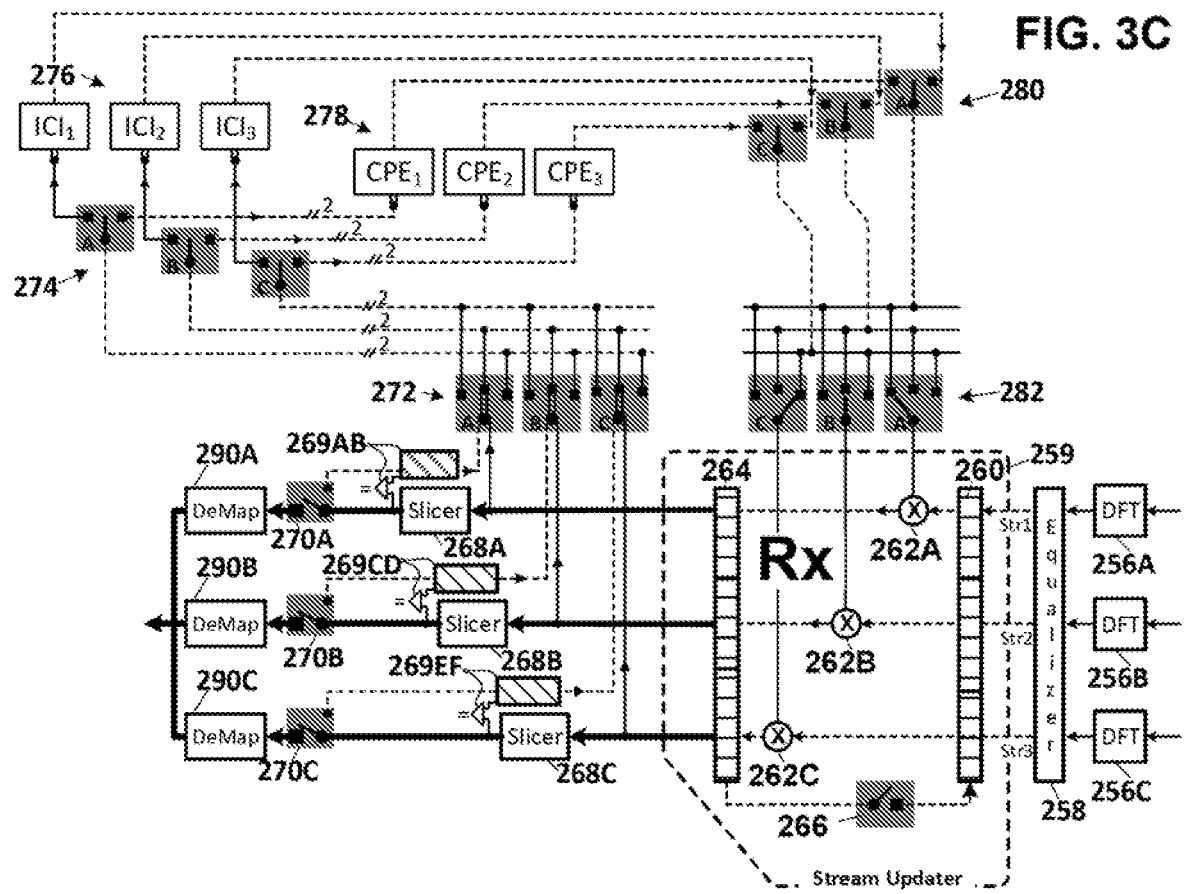

FIGS. 3A-C are hardware diagrams of the phase error mitigation circuits shown in FIG. 2A at various stages of mitigation. FIG. 3A-C shows the components which make up the phase error correction loop in switch state appropriates for respectively: CPE removal, ICI removal, and subsequent baseband processing in a given symbol interval.

FIG. 3A shows the components which make up the phase error correction loop in a switch state appropriate for CPE removal. CPE removal is typically accomplished in a single pass through the phase error removal loop. Initially, the equalizer streams are passed directly through the stream updater to the slicer without modification by the stream updater and more specifically without modification by the multipliers 262A-C. The slicers 268A-C determine for the symbol on each tone on each stream the proximate point on the corresponding constellation diagram. The cross RX chain switch block 270A-C uncouple the corresponding slicer outputs from the remaining baseband components and instead couple the slicer output to switch bank 272. The slicer inputs provide the other input to each switch in the switch bank 272. Switch bank 272 and specifically the "A" and "B" switches thereof, group the slicer input and output for the two streams from user 1, i.e. station 106, together and passes them to the CPE/ICI switch bank 274 switch "A".

Switch bank 272 and specifically the "C" switch thereof passes the single stream from user 2, i.e. station 108, to switch bank 274, switch "B". Switch bank 274 and specifically switch "A" thereof, switchably couples the slicer input and output for the two streams from user 1 to the CPE calculator 278 and specifically CPE calculator "1" thereof, to calculate the CPE removal angle Theta "$\Theta_A$" for the group of streams associated with user 1. The "B" switch of switch bank 274 couples the slicer input and output for the single stream from user 2 to the CPE calculator 278 and specifically CPE calculator "2" for concurrent calculation of the CPE removal angle Theta "$\Theta_B$" for its user's stream(s). Next, the "A" and "B" switches of the switch bank 280 pass the distinct CPE removal angles at the outputs of CPE calculators "1" and "2" to the crossbar inputs of switch bank 282. Switch bank 282 and specifically the "A" and "B" switches thereof pass the CPE phase angle for user 1's two streams as an input to the multipliers 262A and 262B. These multipliers multiply the initial equalizer output on each tone of each of the two streams from user 1 times the CPE phase angle for that group of streams and output the resultant CPE corrected streams 1-2 to stream specific portions of memory register 264. Switch bank 282 and specifically the "C" switch thereof passes the common CPE phase angle for user 2's single stream as an input to the multiplier 262C. This multiplier multiplies the initial equalizer output on each tone of the single stream from user 2 times the CPE phase angle for that user's stream and outputs the resultant CPE corrected stream 3 to a stream specific portion of memory register 264. The CPE error corrected streams in memory register 264 are then copied back via switch 266 into memory register 260 to initialize that register for the next round(s) of phase error processing in the subject symbol interval.

FIG. 3B shows the components which make up the phase error correction loop in a switch state appropriate for ICI removal. Where CPE and ICI removal is joint, the streams output by equalizer are passed directly to the corresponding one of slicers 268A-C. Alternately, where the equalized streams have been subject to a prior round of CPE error removal, each CPE error corrected stream in memory register 264 is passed to the corresponding one of Slicers 268A-C. The cross RX chain switch block 270A-C has uncoupled the corresponding slicer outputs from the remaining baseband components and coupled the slicer outputs to switch bank 272. Memory registers 269B, 269D, 269F store the corresponding slicer output for comparison via comparators 269A, 269C, 269E with the slicer outputs on the next round, pass or iteration. The slicer inputs provide the other input to each switch in the switch bank 272. Switch bank 272 and specifically the "A" and "B" switches thereof, group the slicer input and output for the two streams from user 1, i.e. station 106, together and passes them to the CPE/ICI switch bank 274 switch "A". Switch bank 272 and specifically the "C" switch thereof passes the single stream from user 2, i.e. station 108, to switch bank 274, switch "B". Switch bank 274 and specifically switch "A" thereof, switchably couples the slicer input and output for the two streams from user 1 to the ICI calculator 276 and specifically ICI calculator "1" thereof, to calculate the ICI weighting factors Beta "$\beta_A$" for ICI removal from the group of streams associated with user 1. The "B" switch of switch bank 274 couples the slicer input and output for the single stream from user 2 to the ICI calculator 276 and specifically ICI calculator "2" for concurrent calculation of the ICI weighting factor Beta "$\beta_B$" for removing ICI for its user's stream(s). Next, the "A" and "B" switches of the switch bank 280 pass the distinct ICI weighting factors at the outputs of ICI calculators "1" and "2" to the crossbar inputs of switch bank 282. Switch bank 282 and specifically the "A" and "B" switches thereof pass the ICI weighting factors for each subject and neighboring tones for user 1's two streams as an input to the multipliers 262A and 262B. These multipliers multiply the CPE error corrected symbols for streams 1 and 2 on each subject and neighboring tones of each of the two streams from user 1 times the ICI weighting factors for that group of streams and output the resultant ICI corrected streams 1-2 to stream specific portions of memory register 264. Switch bank 282 and specifically the "C" switch thereof passes the ICI weighting factors for each subject and neighboring tones for user 2's single stream as an input to the multiplier 262C. This multiplier multiplies the CPE error corrected symbols for each subject and neighboring tones for the single stream, stream 3, from user 2 times the ICI weighting factors for that user's stream and outputs the resultant ICI corrected stream 3 to a stream specific portion of memory register 264. The ICI error corrected streams in memory register 264 are then copied back via switch 266 into memory register 260 to initialize that register for the next round(s) of phase error processing in the subject symbol interval. Successive iterations of ICI processing are carried out with the same switch workflow until either a fixed limit is reached or until variations in slicer output between successive iterations of ICI removal falls below a threshold level as determined by the comparators 269A, 269C, 269E.

In an embodiment of the invention the initial processing of the streams output by the equalizer is limited to successive rounds of ICI removal without any precursor CPE removal. ICI removal, at the possible cost of additional iterations, jointly removes CPE and ICI at the same time even without preliminary CPE removal.

FIG. 3C shows the components which make up the phase error correction loop in a switch state appropriate for subsequent baseband processing in a symbol interval after phase errors have been removed from the received streams. The ICI error corrected streams discussed above in connection with FIG. 3B are passed from memory register 264 to the slicers 268A-C. Switch bank 270A-C couples the sliced outputs for each stream to the corresponding one of demappers 290A-C for subsequent baseband processing. The processes discussed above in connection with FIGS. 3A-C are repeated in the next symbol interval.

In an embodiment of the invention either or both the CPE or ICI values determined in a prior symbol interval and stored as tables 214 in memory 210 as shown in FIG. 2B may be used to initialize the first round of CPE and or ICI removal for the subsequent symbol interval, with the possible benefit of a reduction in the number of iterations required to correct the received streams for phase induced errors.

FIG. 4 is a process flow diagram of processes associated with the mitigation of multi-user phase error in the WAP shown in FIG. 2A. Initially in process 400, with an IEEE 802.11ax compliant WAP, a trigger packet is transmitted to associated stations indicating: which users or stations will uplink with the WAP; what the type of uplink will be, e.g. SU-MIMO, MU-MIMO, or OFDMA; and which streams are assigned to each user for the uplink. Control is then passed to decision process 402 in which the receipt of the next RX packet is determined. In the IEEE 802.11ax standard a packet spans many symbol intervals further identified as resource elements. When the next uplink communication packet is detected control passes to process 406. In process 406 the uplink communication type's conformance with the type called for in the trigger packet is confirmed, using the preamble portion of the received packet. If the packet type is SU-MIMO or OFDMA an optional process 408 may be initiated in which pilot tones are used for a preliminary CPE removal. If the packet type is MU-MIMO with two or more stations sharing the same pilot tones then this option is not available. In any event, control passes to process 410 in which each training and payload symbol of the received communication packet is equalized by an equalizer. The equalizer converts the distinct communications on each chain into distinct streams at its output. Then, in process 412 the streams belonging to each user are separated from one another into groups corresponding to the user or station which transmitted them to the WAP. Next in decision process 420 the distinct processing of each group of streams associated with the uplink communication packet is initialized. An SU-MIMO uplink will have a single group of streams. A multi user uplink, whether MU-MIMO or OFDMA will have groups of streams corresponding in number with the number of stations/users transmitting the uplink packet. At the start of each group's phase error removal/correction processing the phase error removal method is determined in decision process 424. Where the phase error removal is serial, control passes to processes 426-428 for the removal of CPE. Where the phase error removal is joint, control passes directly to processes 430 for removal of ICI and CPE jointly.

CPE determination is accomplished in process block 426 in which: 1) the complex conjugate of the symbol on each tone of the subject group of streams is multiplied by the sliced output for each tone; 2) the complex valued scalers resulting from step 1 are then summed across all tones, and 3) the cordic of the scaler determined in step 2 is then determined, where the cordic corresponds to the angle Theta (Θ). Next in process 428 CPE is removed from the subject group of stream(s) by rotating each symbol for each tone of the subject group of stream(s) at the output of the equalizer with the CPE angle Theta (Θ) determined in the prior step. Control then passes to process 430.

In process 430 the ICI kernel weights Beta (p) for each tone in the subject group of streams are determined by solving a system of linear equations each of which characterizes neighbors and subject tone contributions to each subject tone across all tones. The number of neighboring tones involved in this determination will affect the precision and processing power or time required to make the determination. Typically, the number of neighboring tones having a tone index below that of the subject tone will match the number of neighboring tones having a tone index above that of the subject tone. Next in process 432 ICI is removed from the subject group of streams by deconvolving all tones across all the user's streams with the kernel Beta values determined in the prior step. Next control is passed to process 434. In proves 434 the stability of the slicer output is checked, typically by comparing the slicer output on each tone for this iteration with the slicer output for the prior iteration for this group. Next in decision process 436 a determination is made as to whether the variations in per tone slicer output between successive iterations of ICI removal falls below a threshold level. If the slicer outputs between iterations have not stabilized then control is returned to process 430 for another round of ICI removal. Alternately, if slicer output has stabilized then no further iterations of ICI removal for the subject group of streams is necessary and control is passed to process 440. In process 440 the subject group of phase error corrected group of stream(s) is passed to remaining base band processes for demodulation. Control is then returned to decision process 420 for a determination as to whether there are any remaining group of streams to process for the subject uplink. If there are not then the processing of this uplink communication is complete and control is returned to process 400 for the transmission of the next trigger packet.

The components and processes disclosed herein may be implemented in a combination of software, circuits, hardware, and firmware, integrated with the WAP's existing transmit and receive path components, and without departing from the scope of the Claimed Invention.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A wireless access point (WAP) for wireless communication with associated stations on a selected orthogonal frequency division multiplexed (OFDM) communication channel of a wireless local area network (WLAN); and the WAP comprising:
   a plurality of antennas;
   a plurality of components coupled to one another to form receive chains and transmit chains each coupled to a corresponding one of the plurality of antennas for multiple-input multiple-output (MIMO) wireless communications on OFDM tones of the selected OFDM communication channel; and the plurality of components forming the receive chains including:
   an equalizer component converting a received uplink communication packet from one or more of the associated stations at an input into discrete communication streams at an output thereof;
   a slicer component among the plurality of components forming the receive chains, and the slicer component having an input coupled to the equalizer component and an output identifying for each symbol on each OFDM tone of each stream from the equalizer a constellation point proximate to the symbol;
   a stream separation control circuit coupled to the equalizer component to control separation of the discrete communication streams at the output of the equalizer component into groups of streams, with each group of streams comprising all of the discrete communication streams transmitted by a corresponding one of the one or more associated stations;
   an Inter Carrier Interference (ICI) removal circuit coupled to the stream separation control circuit to discretely remove ICI from each group of streams, to improve uplink communication; and
   a phase error evaluation circuit coupled to the slicer component and to the ICI removal circuit, to control iterative removal of ICI from each group of streams by the ICI removal circuit, by determining when variations in slicer output between successive iterations of ICI removal falls below a threshold level.

2. The WAP of claim 1, further comprising:
   the ICI removal circuit generating coefficients for discretely remove ICI from each group of streams separated by the stream separation control circuit; and
   a stream updater circuit coupled to the ICI removal circuit and the equalizer component for applying the coefficients generated by the ICI removal circuit to the OFDM tones of each group of streams from the equalizer component to remove ICI therefrom.

3. The WAP of claim 1, further comprising:
a Common Phase Error (CPE) removal circuit coupled to the stream separation control circuit to discretely remove CPE from each group of streams separated by the stream separation control circuit prior to removal of ICI therefrom by the ICI removal circuit.

4. The WAP of claim 1, wherein the received uplink communication packet comprises at least one of: a multi-user (MU) MIMO communication packet from at least two of the associated stations transmitted on a common set of OFDM tones, and a multi-user OFDM Access (OFDMA) communication packet from at least two of the associated stations transmitted on distinct sets of the OFDM tones.

5. The WAP of claim 1, further comprising:
the ICI removal circuit processing each group of streams separated by the stream separation control circuit in parallel to discretely remove ICI from each group of streams concurrently.

6. The WAP of claim 1, further comprising:
the ICI removal circuit processing each group of streams serially to discretely remove ICI from each group sequentially.

7. The WAP of claim 1, further comprising:
the ICI removal circuit jointly removing both ICI together with Common Phase Error (CPE) from each group of streams discretely.

8. The WAP of claim 1, further comprising:
the ICI removal circuit determining coefficients for removing ICI from each group of streams by solving a system of linear equations each of which characterizes neighboring and self contributions to each subject tone across all OFDM tones in the group of streams.

9. A method of operating a wireless access point (WAP) for wireless communication with associated stations on a selected orthogonal frequency division multiplexed (OFDM) communication channel of a wireless local area network (WLAN); and the method comprising:
providing a number of antennas;
providing a plurality of components coupled to one another to form receive chains and transmit chains each coupled to a corresponding one of the number of antennas for multiple-input multiple-output (MIMO) wireless communications on OFDM tones of the selected OFDM communication channel;
providing an equalizer component converting a received uplink communication packet from one or more of the associated stations into discrete communication streams;
providing a slicer component among the plurality of components forming the receive chains, and the slicer component having an output identifying for each symbol on each OFDM tone of each stream from the equalizer a constellation point proximate to the symbol;
separating the discrete communication streams at output of the equalizer component into groups of streams with each group of streams comprising all the discrete communication streams transmitted by a corresponding one of the one or more associated stations; and
discretely removing Inter Carrier Interference (ICI) independently of a reference signal from each group of streams separated in the separating act, to improve uplink communication; and
iteratively removing ICI from each group of streams until variations in slicer output between successive iterations of ICI removal falls below a threshold level.

10. The method for operating a WAP of claim 9, wherein the act of discretely removing ICI further comprises:
generating coefficients for discretely remove ICI from each group of streams separated in the separating act; and
applying the coefficients generated in the generating act to the OFDM tones of each group of streams from the equalizer component to remove ICI therefrom.

11. The method for operating a WAP of claim 9, further comprising:
discretely removing Common Phase Error (CPE) from each group of streams separated in the separating act prior to removal of ICI therefrom in the act of discretely removing ICI.

12. The method for operating a WAP of claim 9, wherein the received uplink communication packet comprises at least one of: a multi-user (MU) MIMO communication packet from at least two of the associated stations transmitted on a common set of OFDM tones, and a multi-user OFDM Access (OFDMA) communication packet from at least two of the associated stations transmitted on distinct sets of the OFDM tones.

13. The method for operating a WAP of claim 9, the act of discretely removing ICI further comprises:
processing each group of streams separated in the separating act in parallel to discretely remove ICI from each group concurrently.

14. The method for operating a WAP of claim 9, the act of discretely removing ICI further comprises:
processing each group of streams separated in the separating act serially to discretely remove ICI from each group of streams sequentially.

15. The method for operating a WAP of claim 9, the act of discretely removing ICI further comprises:
jointly removing both ICI together with Common Phase Error (CPE) from each group of streams discretely.

16. The method for operating a WAP of claim 9, the act of discretely removing ICI further comprises:
determining coefficients for removing ICI from each group of streams by solving a system of linear equations each of which characterizes neighboring and self contributions to each subject tone across all OFDM tones in the group of streams.

17. A wireless access point (WAP) for wireless communication with associated stations on a selected orthogonal frequency division multiplexed (OFDM) communication channel of a wireless local area network (WLAN); and the WAP comprising:
a plurality of components coupled to one another to form receive chains and transmit chains each operatively coupled to a corresponding one of a plurality of antennas for multiple-input multiple-output (MIMO) wireless communications on OFDM tones of the selected OFDM communication channel; and the plurality of components forming the receive chains including:
an equalizer component converting a received uplink communication packet from one or more of the associated stations at an input into discrete communication streams at an output thereof;
a slicer component among the plurality of components forming the receive chains, and the slicer component having an input coupled to the equalizer component and an output identifying for each symbol on each OFDM tone of each stream of the discrete communication streams from the equalizer a constellation point proximate to the symbol;

a stream separation control circuit coupled to the equalizer component to control separation of the discrete communication streams at the output of the equalizer component into groups of streams, with each group of streams comprising all of the discrete communication streams transmitted by a corresponding one of the one or more associated stations;

an Inter Carrier Interference (ICI) removal circuit coupled to the stream separation control circuit to discretely remove ICI from each group of streams, to improve uplink communication; and a cross RX chain switch fabric to switchably form an ICI removal loop between the slicer component, the ICI removal circuit, and the equalizer component for iterative removal of ICI from the discrete communication streams output by the equalizer component followed by a switchable reconnection of the streams to remaining portions of a receive path components for demodulation.

18. The WAP of claim 17, wherein the received uplink communication packet comprises at least one of: a multi-user (MU) MIMO communication packet from at least two of the associated stations transmitted on a common set of OFDM tones, and a multi-user OFDM Access (OFDMA) communication packet from at least two of the associated stations transmitted on distinct sets of the OFDM tones.

19. A method of operating a wireless access point (WAP) for wireless communication with associated stations on a selected orthogonal frequency division multiplexed (OFDM) communication channel of a wireless local area network (WLAN); and the method comprising:

providing a plurality of components coupled to one another to form receive chains and transmit chains each operatively coupled to a corresponding one of a number of antennas for multiple-input multiple-output (MIMO) wireless communications on OFDM tones of the selected OFDM communication channel;

providing an equalizer component converting a received uplink communication packet from one or more of the associated stations into discrete communication streams;

providing a slicer component among the plurality of components forming the receive chains, and the slicer component having an output identifying for each symbol on each OFDM tone of each stream from the equalizer a constellation point proximate to the symbol;

separating the discrete communication streams at output of the equalizer component into groups of streams with each group of streams comprising all the discrete communication streams transmitted by a corresponding one of the one or more associated stations;

discretely removing Inter Carrier Interference (ICI) independently of a reference signal from each group of streams separated in the separating act, to improve uplink communication;

swichably forming an ICI removal loop between the slicer component and the equalizer component for iterative removal of ICI from the streams output by the equalizer component; and switchably reconnecting the streams subject to ICI removal to remaining portions of a receive path components for demodulation.

20. The method for operating a WAP of claim 19, wherein removing ICI further comprises:

determining coefficients for removing ICI from each group of streams by solving a system of linear equations each of which characterizes neighboring and self contributions to each subject tone across all OFDM tones in the group of streams.

* * * * *